United States Patent [19]

Hofmann

[11] Patent Number: 4,599,278

[45] Date of Patent: Jul. 8, 1986

[54] PAIRING OF MATERIALS FOR HIGHLY STRESSED MACHINE PARTS

[75] Inventor: Peter-Jürgen Hofmann, Herzogenaurach, Fed. Rep. of Germany

[73] Assignee: Kraftwerk Union Aktiengesellschaft, Mülheim am Ruhr, Fed. Rep. of Germany

[21] Appl. No.: 696,455

[22] Filed: Jan. 31, 1985

[30] Foreign Application Priority Data

Feb. 1, 1984 [DE] Fed. Rep. of Germany ....... 3403463

[51] Int. Cl.⁴ ................................................. F16K 3/00
[52] U.S. Cl. .................... 428/591; 251/368; 428/939; 428/627
[58] Field of Search ................. 251/368; 308/DIG. 8; 428/591, 627, 685, 684, 682, 679, 939; 148/15.5

[56] References Cited

U.S. PATENT DOCUMENTS

| | | | |
|---|---|---|---|
| 1,778,765 | 10/1930 | Malcom | 251/368 |
| 1,814,762 | 7/1931 | Mochel | 251/368 |
| 2,051,350 | 8/1936 | Smith | 251/368 |
| 2,208,394 | 7/1940 | Scherer | 251/368 |
| 2,584,161 | 2/1952 | Scherer | 251/368 |
| 3,458,172 | 7/1969 | Burrows | 251/368 |
| 3,829,260 | 8/1974 | Shimoda | 148/15.5 |
| 4,019,928 | 4/1977 | Beyer et al. | 148/15.5 |
| 4,292,094 | 9/1981 | Kunst et al. | 148/15.5 |
| 4,492,604 | 1/1985 | Muller et al. | 148/15.5 |

FOREIGN PATENT DOCUMENTS 80565  7/1981  Japan .................. 251/368

Primary Examiner—L. Dewayne Rutledge
Assistant Examiner—John J. Zimmerman
Attorney, Agent, or Firm—Herbert L. Lerner; Laurence A. Greenberg

[57] ABSTRACT

Material pairing for highly stresses machine parts with sliding friction between two surfaces, particularly for parallel-plate slide valves in a corrosive environment, wherein the one surface is formed by a hard cobalt alloy applied as hard-face welding, and the other surface is formed by a low-alloy, low-chromium steel which is tempered and nitrided.

4 Claims, 1 Drawing Figure

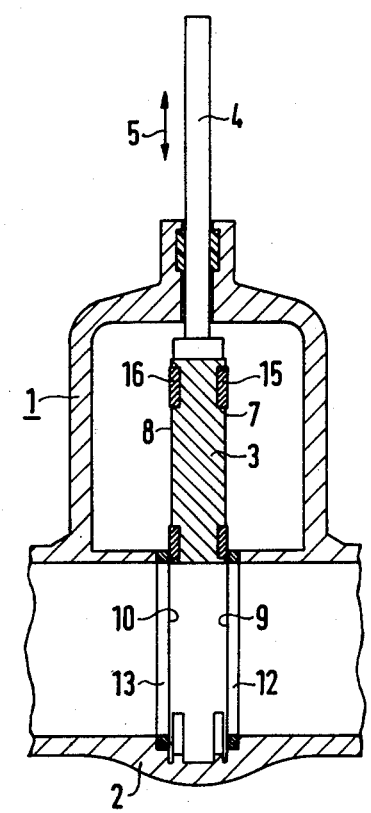

PAIRING OF MATERIALS FOR HIGHLY STRESSED MACHINE PARTS

BACKGROUND OF THE INVENTION

1. Field of the Invention

The invention relates to the pairing of materials for highly stressed machine parts with sliding friction between two surfaces, especially for parallel-plate slide valves in a corrosive environment, wherein the one surface is formed by a hard cobalt alloy applied by surface welding.

2. Description of the Prior Art

An object of the invention is to be able to take up extreme stresses by a novel pairing of materials. Among them are contact pressures up to nearly 500 N/mm$^2$ (newtons per square millimeter) at rubbing velocities of up to about 0.3 m/s (meter per second). At the same time, however, the material should be sufficiently resistant in a corrosive environment, especially in water and saturated steam in the temperature range between room temperature (20° C.) and 300° C.

Tests have shown that the pairing of materials known so far does not meet the above-mentioned requirements, although according to the present state of our knowledge, the best-suited armor alloys have been used for this purpose, especially with the pairing of materials stellite 6 against stellite 12. Stellite is a trademark for nonferrous alloys of cobalt, chromium and tungsten. Friction welding could not be prevented thereby even if distances of only 100 mm had to be traveled at the above-mentioned contact pressures.

SUMMARY OF THE INVENTION

With the foregoing and other objects in view, there is provided in accordance with the invention material pairing for highly stressed machine parts with sliding friction between two surfaces, particularly for parallel-plate slide valves, in a corrosive environment, which comprises, one of the pair of surfaces subjected to sliding friction is formed by a hard cobalt alloy applied as hard-face welding, and the other surface of the pair of surfaces subjected to sliding friction is formed by a low-alloy, low-chromium steel which is tempered and nitrided.

In a preferred embodiment the low-alloy, low-chromium steel is 20 MnMoNi 5 5 steel which is treated as follows:

1. generating a nitrided layer with a thickness of 20 to 40 μm on the low-alloy, low-chromium steel by subjecting the steel to nitridation in a sodium-potassium cyanate-carbonate bath at a temperature within the range of 570° to 590° C.,
2. oxidizing the layer surface in a cooling bath with a hydroxide base at a temperature within the range of 230° to 300° C.,
3. removing 2 to 3 μm from the layer surface by a polishing treatment for smoothing out roughness peaks, and
4. oxidizing the layer surface again to form a magnetite coating.

Other features which are considered as characteristic for the invention are set forth in the appended claims.

Although the invention is illustrated and described herein as embodied in pairing of materials for highly stressed machine parts, it is nevertheless not intended to be limited to the details shown, since various modifications may be made therein without departing from the spirit of the invention and within the scope and range of equivalents of the claims.

BRIEF DESCRIPTION OF THE DRAWING

The invention however, together with additional objects and advantages thereof will be best understood from the following description when read in connection with the accompanying drawing which diagrammatically illustrates a slider valve in a vertical section. In the opening position of the valve the slider is as shown. In the closing position of the valve, the slider moves down between two rings and closes off an opening in each ring through which fluid flows. The surfaces of the two rings are formed by a hard cobalt alloy applied as hard-face welding. The slider has rings protruding therefrom, the surfaces of which rings are formed by low-alloy, low-chromium steel which is tempered and nitrided.

DESCRIPTION OF THE PREFERRED EMBODIMENT

According to the invention, in a material pairing of the type mentioned at the outset, one surface is formed by a hard cobalt alloy applied as hard-face welding and the other surface is formed by a low-alloy, low-chromium steel which is tempered and nitrided.

The material pairing "hard cobalt alloy" against a nitrided layer on low-alloy, low-chromium steel has been found superior with respect to the tribological properties, although this is in contradiction with the tribological rule that with unlubricated sliding friction a particularly advantageous behavior is obtained if both friction surfaces have approximately the same hardness.

With respect to the formation of the nitrided layer, in the present invention one deviates from the customary objective to generate chromium nitrides with the high hardness connected therewith. Instead, nitride layers are generated on the low-chromium or preferably chromium-free base material (except for impurities—an amount of 0.25% or less of chromium in the low chromium alloy is considered an impurity). Nevertheless, the hardness of such nitrided low-alloy, low-chromium steel which is to be one of the two surfaces to be paired for sliding friction is distinctly higher than that of hard cobalt alloys. These nitride layers on the low-alloy, low-chromium steel have the advantage of increased corrosion resistance in the relevant media in which they operate, such as water and saturated steam at a temperature up to 300° C.

A chromium-free steel found particularly suitable for use in the invention is 20 MnMoNi 5 5 listed in the TUeV material sheet 401/3.

A four-step method which is well suited for treating the low-alloy steel, particularly 20 MnMoNi 5 5, of the material pairing according to the invention is as follows:

1. generating a nitrided layer with a thickness of 20 to 40 μm on the low-alloy, low-chromium steel by subjecting the steel to nitridation in a sodium-potassium cyanate-carbonate bath at a temperature within the range of 570° to 590° C.,
2. oxidizing the layer surface in a cooling bath with a hydroxide base at a temperature within the range of 230° to 300° C.,
3. removing 2 to 3 μm from the layer surface by a polishing treatment for smoothing out roughness peaks, and 4. oxidizing the layer surface again to form a magnetite coating.

The pairing of materials according to the invention with this treatment has shown a reduction of the friction coefficient to approximately ⅓. Welding at the rubbing surfaces which otherwise occurred after the termination of the rubbing motion no longer happened. The materials also evidenced sufficient corrosion behavior, an essential property, during the shutdown phases of a steam line, i.e. at 20° C. in a water atmosphere as well as under operating conditions (about 300° C. in water and saturated steam).

To explain the invention in greater detail, a simplified embodiment example will be described, with reference to the attached drawing.

The parallel slide valve 1 shown in the drawing serves as a shutoff valve for the main stream line of a pressurized water reactor. For this reason, its housing 2 of low-alloy, low-chromium steel, 20 MnMoNi 5 5 according to TUeV material sheet 401/3, is designed for about 88 bar and approximately 300° C. It has a nominal aperture of 700 mm. A slider plate 3 of 20 MnNoNi 5 5 low-alloy steel serves as the shutoff organ. The slider plate can be moved by a plunger 4 at right angles to the axis of the housing 2, as indicated by the arrow 5. The surfaces 7 and 8 of the slider plate 3 slide on outer surfaces 9 and 10 in the interior of the slider housing 2. This causes extreme stresses in the vicinity of the closed position because of the pressure forces, as was explained at the outset.

The surfaces 9 and 10 are formed by rings 12 and 13 which have a rectangular cross-section with a side length of about 35×270 mm and an inside diameter of 590 mm. The rings 12, 13 carry a layer of stellite 6 made as hard-face welding with a layer thickness of about 3 to 4 mm. The rings 12 and 13 are fastened in the housing tube by welded joints.

As the other partner of the material pairing, rings 15 and 16 of tempered and nitrided 20 MnMoNi 5 5 are arranged in the slider plate 3 which protrude slightly, for instance, by 2 mm, from the slider plate 3. The rings 15, 16 were made with machine tools to the dimensions of 40 mm thickness and 630/665 mm diameter and a surface roughness $R_t$ of less than 5 μm. Then, the rings were provided in a bath nitridation process with a nitrided layer of about 30 μm which was subsequently oxidized at the surface in a cooling bath. The surface was then smoothed by a polishing treatment, in which about 2 to 3 μm were removed. Finally, the surface was again oxidized for a short time, i.e. several minutes to, at most, half an hour to form a magnetite coating. The rings 15, 16 treated in this manner are then inserted into prepared slots in the slider plate 3 and fastened by means of countersunk screws.

As mentioned, the material pairing according to the invention has been found practical in other places with high stress of the type mentioned at the outset, for instance, for extremely highly stressed bearings in a corrosive atmosphere as well as for highly stressed supports, in which certain movements are expected in view of thermal expansion.

| DEFINITIONS: | |
|---|---|
| Stellite 6 | Trademarks of |
| Stellite 12 | Cabot Corporation |
| | 1020 W. Park Avenue |
| | Kokomo, IN 46901 |

Similar alloys are manufactured by many other companies.

| | Composition % | | | |
|---|---|---|---|---|
| Material | Cr | C | W | Co |
| Stellite 6 | 27–28 | 1.1–1.4 | 4–4.5 | Bal. |
| Stellite 12 | 27–29 | 1.4–1.9 | 8–8.5 | Bal. | hard cobalt alloy = alloys of the Stellite type, i.e. cobalt alloys with high carbon contents of about 1 to 2% and high chromium contents of about 20 to 35%.
low-alloy, low-chronium steel = iron base (Fe) with less than 5% alloy components, of which at most 2.5% is chromium.

| | Composition % | | | | |
|---|---|---|---|---|---|
| Material | C | Cr | Mo | Ni | Mn | Fe |
| 20 Mn Mo Ni 55 | 0.20 | ≦0.3 | 0.52 | 0.60 | 1.3 | Bal. |

There is claimed:

1. Material pairing for highly stressed machine parts with sliding friction between two surfaces, particularly for parallel-plate slide valves, in a corrosive environment, which comprises, one of the pair of surfaces subjected to sliding friction is formed of a hard cobalt alloy applied as hard-face welding, and the other surface of the pair of surfaces subjected to sliding friction is formed by a low-alloy, low-chromium steel which has been tempered and nitrided.

2. Material pairing according to claim 1, wherein the low-alloy steel is free of chromium.

3. Material pairing according to claim 1, wherein the low-alloy steel is steel comprising 20% Mn, 5% Mo, 5% Ni.

4. Material pairing according to claim 1, wherein the low-alloy, low-chromium steel is steel comprising 20% Mn, 5% Mo, 5% Ni which has been treated as follows:
   (a) generating a nitrided layer with a thickness of 20 to 40 μm on the low-alloy, low-chromium steel by subjecting the steel to nitridation in a sodium-potassium cyanate-carbonate bath at a temperature within the range of 570° to 590° C.,
   (b) oxidizing the layer surface in a cooling bath with a hydroxide base at a temperature within the range of 230°0 to 300° C.,
   (c) removing 2 to 3 μm from the layer surface by a polishing treatment for smoothing out roughness peaks, and
   (d) oxidizing the layer surface again to form a magnetite coating.

* * * * *